United States Patent
Ameye et al.

(10) Patent No.: US 7,305,810 B2
(45) Date of Patent: Dec. 11, 2007

(54) METHOD OF OPERATING AN AGRICULTURAL VEHICLE

(75) Inventors: Danny R. Ameye, Zonnebeke (BE); Ward M. R. Byttebier, Zwevegem (BE)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 11/371,869

(22) Filed: Mar. 9, 2006

(65) Prior Publication Data

US 2006/0213166 A1    Sep. 28, 2006

(30) Foreign Application Priority Data

Mar. 9, 2005    (GB)    .................................... 0504803.8

(51) Int. Cl.
    *A01D 41/127*    (2006.01)
(52) U.S. Cl. .............. 56/10.2 R; 56/10.2 J; 56/DIG. 2; 477/83; 477/90; 460/3
(58) Field of Classification Search ............. 56/10.2 J, 56/11.1, 11.3, 11.4, 11.5, 11.7, 16.9, DIG. 2, 56/DIG. 4, DIG. 6, DIG. 15; 340/425.5, 340/438; 477/83, 90, 181
    See application file for complete search history.

(56) References Cited

U.S. PATENT DOCUMENTS 4,297,829 A * 11/1981 Hoff ............................ 56/11.3
6,690,267 B2 * 2/2004 Linden et al. .............. 340/432
2001/0036882 A1 * 11/2001 Hrazdera ..................... 477/166

FOREIGN PATENT DOCUMENTS

GB    2 058 254 A    4/1981

* cited by examiner

*Primary Examiner*—Thomas B. Will
*Assistant Examiner*—Mai T Nguyen
(74) *Attorney, Agent, or Firm*—Patrick M. Sheldrake; John William Stader; Michael C. Harms

(57) ABSTRACT

A method is described for operating an agricultural vehicle to reduce the time taken for rotating components of the crop processing machinery driven by the vehicle engine to reach a standstill. The method comprises the steps of sensing when a signal is generated by the vehicle operator to disengage the drive from the engine to the rotating components, reducing the engine speed in response to the sensed signal to a minimum value below a steady idling speed of the engine, disengaging the drive to the rotating components after the engine speed has reached the minimum value, and increasing the engine speed to a value equal to or greater than the steady idling speed after the disengagement of the drive to the rotating components.

5 Claims, 1 Drawing Sheet

METHOD OF OPERATING AN AGRICULTURAL VEHICLE

FIELD OF THE INVENTION

The present invention relates to a method of operating an agricultural vehicle to reduce the time taken for rotating components driven by the vehicle engine to reach a standstill.

BACKGROUND OF THE INVENTION

When operating an agricultural machine, such as a forage or combine harvester, one can sometimes pick up from the field an article that interferes with the operation of the machine or a blockage may occur within the machine for any of a variety of reasons. In such an event, the moving components involved in harvesting and processing the crop, need to be stopped so that the obstruction can be located and the problem remedied.

The moving components are usually accessed by removing a cover and for safety reasons it is important that the cover should not be removed until all the moving components have come to a standstill. Safety legislation in many countries requires an audible alarm to be sounded while it remains dangerous to remove the cover protecting the moving components.

The components are not normally braked and, as a result, after the operator disengages the drive from the vehicle engine, the components continue to rotate for a considerable time on account of their own inertia. Waiting for the machinery to come to a complete standstill sometimes proves too frustrating for the operator and through impatience the cover is opened too soon, thereby creating a serious risk of injury to the operator.

OBJECT OF THE INVENTION

The invention seeks therefore to minimize the time that it takes for the rotating components of an agricultural machine to come to a standstill after the drive from the engine has been disengaged.

SUMMARY OF THE INVENTION

According to the present invention, there is provided a method of operating an agricultural vehicle to reduce the time taken for rotating components driven by the vehicle engine to reach a standstill, which method comprises the steps of:

sensing when a signal is generated by the vehicle operator to disengage the drive from the engine to the rotating components, reducing the engine speed in response to the sensed signal to a minimum value below a steady idling speed of the engine, disengaging the drive to the rotating components after the engine speed has reached the said minimum value, and increasing the engine speed to a value equal to or greater than the steady idling speed after the disengagement of the drive to the rotating components.

Harvesters normally have large capacity diesel engines that are operated at a constant speed yielding optimum efficiency while they are being used for crop processing. The speed of movement of the machine is controlled by selection of the gear ratio, not by changing the speed of rotation of the engine. When the vehicle is stopped and drive is disconnected from the crop processing machinery by disengaging a clutch, the engine is conventionally operated at a relatively high idling speed sufficient to allow it to run smoothly while providing power for ancillary equipment, such as cabin air conditioning.

The present invention takes advantage of the fact that the engine speed can, at least on some occasions, be allowed to drop below its normal idling speed without stalling. The unevenness of the engine when running below its normal idling speed is not a major consideration so long as it does not stall, and the inertia of the crop processing machinery itself serves to prevent the engine from stalling. Thus by temporarily allowing the engine speed to drop below its normal idling speed before disengaging the clutch driving the rotating components of the crop processing machinery, the invention reduces the speed of the components at the instant of drive disengagement. As the components now start with less angular momentum, it takes less time for friction to bring them to a complete standstill. Once disengagement has taken place, the engine can once again be allowed to run at its normal idling speed.

In the prior art, the audible alarm used to warn the vehicle operator not to open the cover does not change in any way until all the components have come to a standstill, at which time it is discontinued. Because the sound gives no indication of how much longer one may have to wait before it is safe to open the cover, the operator's patience is severely tested. It is therefore not unknown for the operator to open the cover prematurely, if only to be able to assess visually how much longer it will take before the machinery comes to a standstill.

To mitigate this disadvantage, a preferred embodiment of the invention includes the additional step of emitting an audible alarm signal while components of the processing machinery are still rotating, the signal having a characteristic that varies with the speed of rotation of the components. The characteristic is preferably the pitch and/or a pulse repetition frequency of the audible signal though it is alternatively possible for it to be the loudness.

BRIEF DESCRIPTION OF THE DRAWING

The invention will now be described further, by way of example, with reference to the accompanying drawing, FIG. 1, which is a schematic diagram of an agricultural machine for harvesting and/or processing crop.

DESCRIPTION OF THE PREFERRED EMBODIMENT

Figure 1:
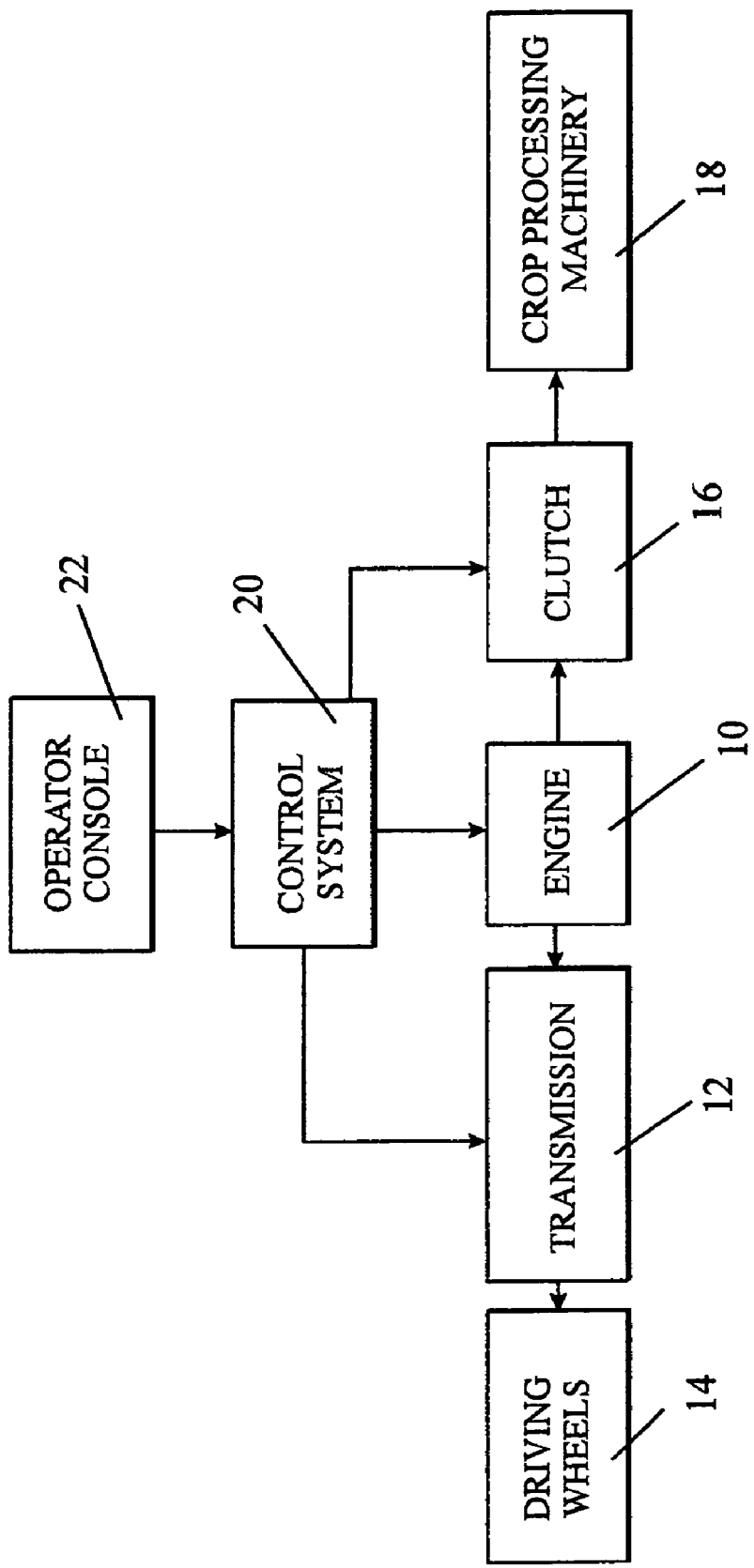

The single drawing is intended only to represent an agricultural machine for harvesting and/or processing crop, such as a conventional harvester and, though schematic, the diagram is believed to be sufficient for an understanding of the present invention. Reference may be made to numerous prior art patent specifications for a more detailed explanation of the operation of combine and forage harvesters, amongst them for example EP 1 387 230 and U.S. Pat. No. 6,690,285 both of which also address the problem of the risk of injury presented to the operator by rotating components of the crop processing machinery.

Referring to FIG. 1, the agricultural machine comprises an engine 10 which is connected to the driving wheels 14 through a variable ratio transmission 12. The same engine 10 drives crop processing machinery 18 through a clutch 16.

The engine 10, the transmission 12 and the clutch 16 are controlled by a control system 20 which is itself connected to receive commands given by the vehicle operator using a console 22.

In normal crop processing operation, the engine 10 runs at a constant working speed, selected to allow the engine to operate in its most fuel efficient manner. This running speed may typically be around 2400 rpm for example. The speed of the harvester is determined by the selected gear ratio of the transmission 12. The clutch 16 is engaged and drives the machinery 18 of the harvester with constant speed. The nature of the machinery will depend on the type of harvesting and or processing as well as the crop but it will invariably include rotating components driven by the engine 10 through a clutch 16.

If while operating in this manner the operator detects a malfunction of some sort within the machinery, he needs to stop the machine and then get out of his cab to inspect the harvesting/processing machinery. To stop the movement of the machine, brakes are applied, a neutral gear is selected in transmission 12 and the engine speed is reduced to its normal idling speed, which is typically around 800 rpm for example. To stop the machinery 18, the clutch 16 is then disengaged and the operator leaves the cab to inspect the crop processing machinery.

Though the clutch 16 has been disengaged, the rotating components of the machinery 18 continue to turn for some time, termed the run-out time, on account of their own inertia. Sensors are provided, for example in the operator's seat, to detect when the operator leaves the cab. Other sensors are provided to sense when components of the processing machinery are still turning. If the operator leaves the cab while the processing machinery is still turning, an alarm is sounded to warn the operator against uncovering the rotating components, to avoid any danger to the operator. Because the run-out time can be prolonged, it is known for operators not to take heed of the alarm and to uncover components that are still rotating.

To reduce the run-out time, the present invention proposes disconnecting the clutch 16 while the engine 10 is running temporarily at a speed below its stable idling speed, typically around 600 rpm for example. Because the kinetic energy is proportional to the square of the rotational speed, reducing the speed in this way has a marked effect on the time taken for the components to come to a complete standstill. Thus, for example, the energy of components turning at 800 rpm is about 1.77 as great as when the same components rotate at 600 rpm and a reduction of three sevenths in the time taken to reach a standstill can thus be achieved by reducing the initial speed of the machinery on disengagement of the clutch 16 by only 200 rpm.

The reduced idling speed of 600 rpm may not be sufficient to achieve even running of the engine, especially when ancillary equipment, such as an air conditioning compressor or an alternator, continue to be driven while the engine is idling. Because the reduction of engine speed will only be temporary, the engine being returned to its idling speed by the control system 20 after disengagement of the clutch 16, the uneven running of the engine will be of no consequences and it will not risk stalling because crop processing machinery will itself act as a very large flywheel before the clutch 16 is disengaged.

In the invention, when the operator commands the control system 20 to disengage the clutch 16, the command is not followed immediately but instead the control system 20 acts on the engine 10 to reduce its speed, this being carried out in the case of a diesel engine by reducing the injected fuel quantity. When the engine 10 reaches a speed below the normal idling speed, the clutch 16 is disengaged and immediately thereafter normal idle speed control of the engine is resumed so that the engine speed only drops temporarily.

As in the prior art, an audible alarm is produced if the crop processing machinery is rotating while the operator is out of the cab as sensed by one or more sensors, such as a sensor placed in the drives seat. However, in a preferred embodiment of the invention, the pitch or repetition frequency of the emitted sound is varied as the components slow down as detected by one or more sensors detecting the component speed. Therefore, in addition to the waiting time being reduced, the sound heard by the operator gives an indication of how much longer it will take before the machinery comes to a complete stop, reducing the likelihood of the operator becoming impatient and exposing the rotating components of the processing machinery prematurely.

The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

The invention claimed is:

1. A method of operating an agricultural vehicle to reduce the time taken for rotating components of the crop processing machinery driven by the vehicle engine to reach a standstill, which method comprises the steps of:
   sensing when a signal is generated responsive to a vehicle operator action to disengage a drive from the engine to the rotating components;
   reducing the engine speed in response to the sensed signal to a minimum value below a steady idling speed of the engine, the minimum value being reliant on kinetic energy of the rotating components to prevent stalling the engine;
   disengaging the drive to the rotating components after the engine speed has reached the minimum value; and
   increasing the engine speed to a value equal to or greater than the steady idling speed after the disengagement of the drive to the rotating components and prior to stalling the engine.

2. The method of claim 1, further comprising the step of emitting an audible alarm signal while components of the processing machinery are still rotating, the signal having a characteristic that varies with the speed of rotation of the components.

3. The method of claim 2, wherein the pitch of the audible signal varies with the speed of rotation of the components of the crop processing machinery.

4. The method of claim 2, wherein the pulse repetition frequency of the audible signal varies with the speed of rotation of the components of the crop processing machinery.

5. The method of claim 3, wherein the pulse repetition frequency of the audible signal varies with the speed of rotation of the components of the crop processing machinery.

* * * * *